United States Patent
Ghanwani et al.

(10) Patent No.: US 8,929,218 B2
(45) Date of Patent: Jan. 6, 2015

(54) CONGESTION NOTIFICATION ACROSS MULTIPLE LAYER-2 DOMAINS

(75) Inventors: Anoop Ghanwani, Rocklin, CA (US); Shunjia Yu, San Jose, CA (US)

(73) Assignee: Brocade Communication Systems, Inc., San Jose, CA (US)

( * ) Notice: Subject to any disclaimer, the term of this patent is extended or adjusted under 35 U.S.C. 154(b) by 274 days.

(21) Appl. No.: 13/113,917

(22) Filed: May 23, 2011

(65) Prior Publication Data

US 2012/0063316 A1 Mar. 15, 2012

Related U.S. Application Data (60) Provisional application No. 61/381,674, filed on Sep. 10, 2010.

(51) Int. Cl.
*H04L 12/801* (2013.01)
*H04L 12/825* (2013.01)

(52) U.S. Cl.
CPC ............ *H04L 47/10* (2013.01); *H04L 47/26* (2013.01)

USPC .......................................................... 370/235

(58) Field of Classification Search
USPC .......................................................... 370/235
See application file for complete search history.

(56) References Cited

U.S. PATENT DOCUMENTS

| | | | |
|---|---|---|---|
| 8,121,038 B2* | 2/2012 | Bergamasco et al. | 370/236 |
| 2008/0159260 A1* | 7/2008 | Vobbilisetty et al. | 370/351 |
| 2011/0299391 A1* | 12/2011 | Vobbilisetty et al. | 370/230.1 |

\* cited by examiner

*Primary Examiner* — Huy D Vu
*Assistant Examiner* — Bao G Nguyen
(74) *Attorney, Agent, or Firm* — Shun Yao; Park, Vaughan, Fleming & Dowler LLP (57) ABSTRACT

One embodiment of the present invention provides a congestion notification. During operation, the system receives a congestion notification message with a destination layer-2 address set as the receiving mechanism's layer-2 address. The system modifies a destination layer-2 address, a source layer-2 address, and optionally a VLAN identifier of the congestion notification message, and forwards the modified congestion notification message.

24 Claims, 9 Drawing Sheets

FIG. 1 (PRIOR ART)

| | | |
|---|---|---|
| 202 { | DA = SA of sampled frame | 6 octets |
| | SA = address of sending port | 6 octets |
| | VLAN tag (VID = VID of sampled frame, pri = CNM priority) | 4 octets |
| 204 { | CN-TAG Etype (0x22E9) | 2 octets |
| | Flow ID = Flow ID of sampled frame | 2 octets |
| 206 { | CNM Etype (0x22E7) | 2 octets |
| | Version (4 bits) Reserved (6 bits) Quantized Feedback (FB) (6 bits) | 2 octets |
| | Congestion Point ID (CPID) | 8 octets |
| | cpQOffset | 2 octets |
| | cpQDelta | 2 octets |
| | Encapsulated priority | 2 octets |
| | Encapsulated MAC DA | 6 octets |
| | Encapsulated MSDU length | 2 octets |
| | Encapsulated MSDU | 0-64 octets |
| 208 | Pad | |
| 210 | CRC | 4 octets |

CONGESTION NOTIFICATION ACROSS MULTIPLE LAYER-2 DOMAINS

This application claims the benefit of U.S. Provisional Application No. 61/381,674, entitled "Congestion Notification and Routers, FCFs, and FCoE-to-FC Gateways," by inventors Anoop Ghanwani and Shunjia Yu, filed 10 Sep., 2010, the disclosures of which are incorporated by reference herein

BACKGROUND

1. Technical Field

This disclosure relates to computer networking. More specifically, this disclosure relates to systems and techniques for delivering congestion notifications in a network involving more than one layer-2 domain.

2. Related Art

Congestion notification (CN) has proved to be a useful tool for congestion management of long-lived data flows within network domains such as data centers, backplane fabrics, computing clusters, and storage networks. According to IEEE standard 802.1Qau (available at http://standards.ieee.org/about/get/802/802.1.html), the congestion notification (CN) mechanism can detect and mitigate queue congestions for selected classes of traffic in virtual bridged LANs by enabling bridges to signal congestion to end stations to avoid frame loss. In a CN-enabled network, when a switch detects congestion, the switch selects a frame from the congested queue and sends a congestion notification message (CNM) to the source of the selected frame. In response to the CNM, the source (also called a reaction point (RP)) decreases its transmission rate.

However, congestion notification is an end-to-end solution designed to operate within a single layer-2 domain, which means it terminates at devices that remove/replace source and/or destination media access control (MAC) headers. In a network that includes devices operating above layer 2, such as Internet Protocol (IP) routers or Fibre Channel Forwarders (FCFs), the CNMs will not be able to reach end stations at the other side of such devices. As a result, congestion notification as defined by the IEEE 802.1Qau standard cannot work in a network that includes multiple layer-2 domains, such as a Fibre Channel over Ethernet (FCoE) network.

SUMMARY

One embodiment of the present invention provides a system for congestion notification. During operation, the system receives a congestion notification message with a destination layer-2 address set as the layer-2 address of a receiving mechanism within the system. The system modifies a destination layer-2 address, a source layer-2 address, and optionally a virtual local area network (VLAN) identifier of the congestion notification message, and forwards the modified congestion notification message.

In a variation on this embodiment, the identifier of the source of congestion is contained in a MAC service data unit in the congestion notification message.

In a variation on this embodiment, the identifier of the source of congestion is an IP address or Fibre Channel source ID.

In a variation on this embodiment, the system determines a layer-2 destination address based on the identifier of the source of congestion. The system further generates a layer-2 header based on the determined layer-2 destination address for the congestion notification message.

In a variation on this embodiment, the layer-2 header is an Ethernet header.

In a variation on this embodiment, the system looks up a destination layer-2 address based on the identifier of the source of congestion.

In a variation on this embodiment, the system removes the layer-2 header of the received congestion notification message.

In a variation on this embodiment, the received congestion notification message is in compliance with IEEE standard 802.1Qau. Furthermore, the identifier of the source of congestion is contained in a MAC service data unit within the message.

One embodiment of the present invention provides a system for generating a congestion notification message (CNM) packet. During operation, the system detects congestion at a network switch, selects a packet from a plurality of packets received by the switch. The selected packet includes an outer packet header, an inner packet header, and an encapsulated frame. The system deduces the source address associated with the selected packet based on information included in the encapsulated frame, generates a new inner packet header using the deduced source address as a destination address, and generates a CNM packet which includes the new inner packet header.

In a variation on this embodiment, the encapsulated frame is a Fibre Channel over Ethernet (FCoE) frame, which includes an Ethernet header and at least a portion of an encapsulated Fibre Channel (FC) frame.

In a further variation, the system performs an FC-MAP lookup based on a VLAN ID included in the FCoE frame.

In a further variation, the system deduces the source address associated with the selected packet by appending an FC source identifier (FC S_ID) included in the encapsulated FC frame to the FC-MAP.

In a variation on this embodiment, the new inner packet header includes an Ethernet destination address field, an Ethernet source address field, and a virtual local area network identifier (VLAN ID) field.

In a variation on this embodiment, the switch is a routing bridge (RBridge) which implements a Transparent Interconnection of Lots of Links (TRILL) protocol, and the CNM packet is a TRILL packet.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

Embodiments of the present disclosure provide a solution for enabling congestion notification messages (CNMs) within a network that includes routers or FCoE gateways. Conventional CNMs terminate at a device operating above layer 2, such as an IP router or an FCF, because the router or FCF removes and/or modifies the MAC addresses of all frames that it processes (including the CNMs). Consequently, a conventional CNM cannot reach end stations at the other side of a router or FCF because there is no way to generate a new MAC header for a CNM (CNMs by themselves are not routable). To solve this problem, embodiments of the present disclosure allow an IP router or FCF to route a received CNM based on source address information of the sampled frame associated with the CNM. The system creates a new outer layer-2 header for the CNM based on a lookup of the IP/FC source address, which is included in the encapsulated MAC service data unit (MSDU) of the received CNM. In an FCoE network where an edge device maintains mapping information between the FC addresses and the virtual local area network (VLAN) identifiers and where there exists a "switched path" between a source and destination which bypasses the FCFs, such as an FCoE network implementing the Transparent Interconnection of Lots of Links (TRILL) protocol, embodiments of the present disclosure generate CNMs that are addressed directly to the destination end stations instead of the FCF. To do so, the system obtains the FC MAC address prefix (FC-MAP) of the VLAN ID of the sampled frame in order to derive the destination address of the CNM, thus preventing an FCF from processing the CNM frame.

In this disclosure, the term "router" typically refers to an IP router capable of forwarding Internet Protocol version 4 (IPv4) and/or IP version 6 (IPv6) traffic. A router can function as an edge router (including subscriber edge router or inter-provider border router) or a core router.

The term "Fibre Channel forwarder (FCF)" typically refers to an Ethernet switch capable of forwarding FCoE traffic from one Ethernet port to another Ethernet port by de-encapsulating/encapsulating FCoE frames and performing lookups on the encapsulated FC frame headers. Within the context of congestion notification, the routers and the FCFs are similar because both of them terminate conventional CNMs. Therefore, in this disclosure, the terms "router" and "FCF" are used interchangeably and can generally refer to any network equipment operating above layer 2.

The term "RBridge" refers to routing bridges, which are bridges implementing the TRILL protocol as described in IETF draft "RBridges: Base Protocol Specification," available at http://tools.ietf.org/html/draft-ietf-trill-rbridge-protocol-16, which is incorporated by reference herein. Embodiments of the present invention are not limited to the application to RBridges. Other types of switches, routers, and forwarders can also be used.

The terms "frame" or "packet" refer to a group of bits that can be transported together across a network. "Frame" should not be interpreted as limiting embodiments of the present invention to layer-2 networks. "Packet" should not be interpreted as limiting embodiments of the present invention to layer-3 networks. "Frame" or "packet" can be replaced by other terminologies referring to a group of bits, such as "cell" or "datagram."

The term "layer 2" refers to the data link layer in the Open Systems Interconnection (OSI) model. Layer 2 often includes a logical link control (LLC) sublayer and a media access control (MAC) sublayer. Ethernet is a common layer 2 implementation. Although the Fibre Channel protocol is not defined according to the OSI model in particular, FCFs are considered as operating on top of layer 2 because they operate on Ethernet media. Therefore, the term "a device operating above layer 2" can refer to IP routers, FCFs, or any network equipment that operates on top of layer 2. Further more, the term "layer-2 domain" refers to a network domain where packets can be forwarded based on layer-2 header processing, i.e., without removing layer-2 header and processing on upper layers, such as the IP or FC layer.

Congestion Notification in the Presence of Routers/FCFs

Figure 1:
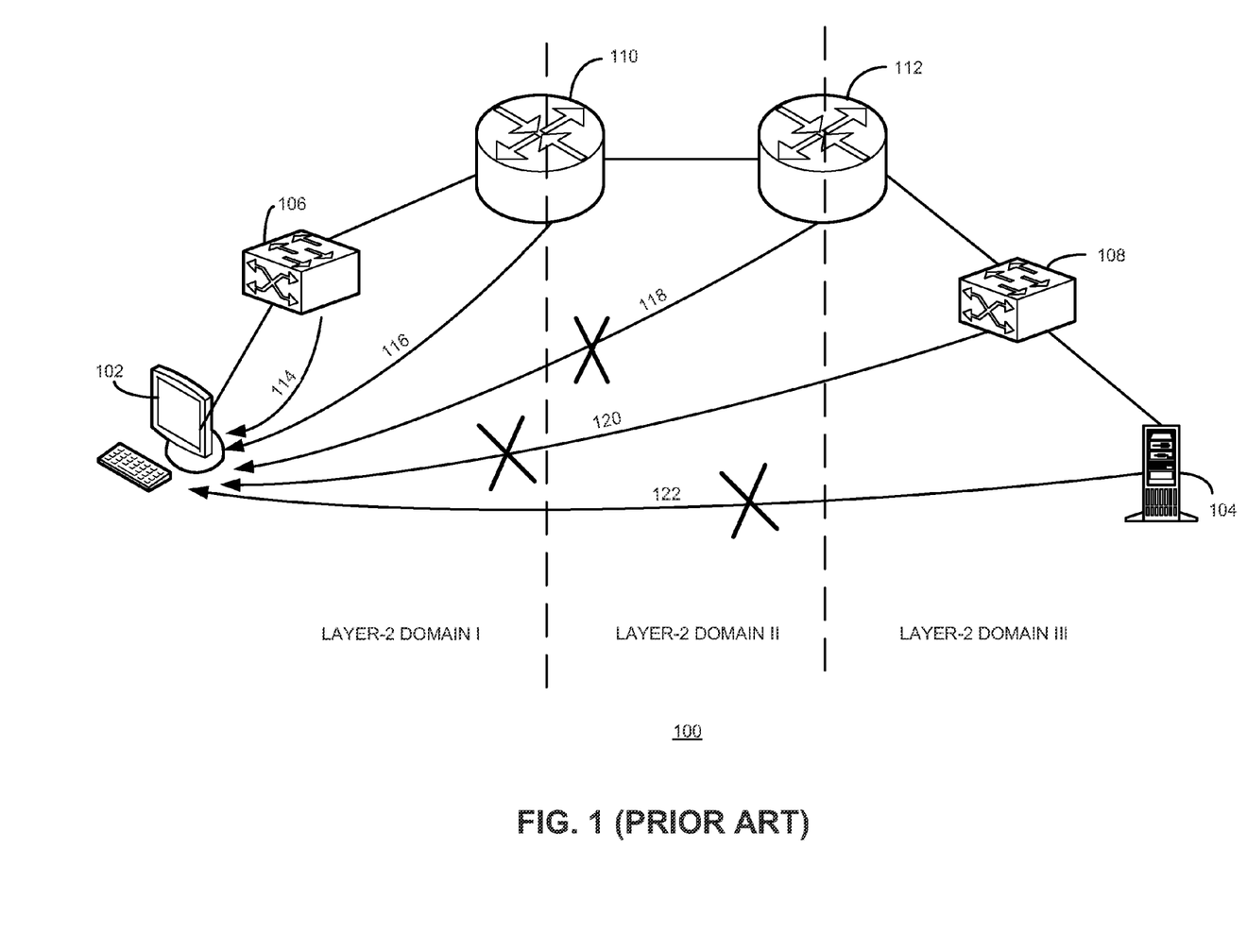
FIG. 1 illustrates a conventional congestion notification mechanism in an exemplary network that includes routers/Fibre Channel forwarders (FCFs) (prior art).

FIG. 1 illustrates a conventional congestion notification mechanism in an exemplary network that includes routers/Fibre Channel forwarders (FCFs) (prior art). A network 100 includes a number of end stations 102-104, a number of layer-2 switches 106-108, and a number of routers 110-112 (which can also be FCFs). In FIG. 1, in order to reach end station 104, a packet from end station 102 needs to pass through layer-2 switches 106-108 and routers 110-112, and congestion can occur at any point along the data path. Note that network 100 includes three separate layer-2 domains (layer-2 domains I, II, and III, as shown in FIG. 1), each terminating at a router. If a congestion point (CP) resides within the same layer-2 domain as the source of a traffic flow causing the congestion, then the conventional CN mechanism is sufficient. For example, if a CP is located at switch 106, then switch 106 can generate a CNM destined to end station 102. Because switch 106 and end station 102 belong to the same layer-2 domain I, the generated CNM, which has end station 102's MAC address as the destination address in its MAC header, can successfully reach end station 102. Arrow 114 illustrates a CNM flowing from switch 106 to end station 102. Similarly, if congestion occurs at router 110, router 110 can generate a CNM with end station 102's MAC address as its destination address, which can be delivered to end station 102 by switch 106. Arrow 116 illustrates a CNM flowing from router 110 to end station 102.

However, if the CP is located in a different layer-2 domain from the layer-2 domain of the congestion source, then the conventional CN mechanism will run into problems. For example, if congestion which occurs at router 112 is caused by end station 102, the CNM generated by router 112 cannot be sent back to end station 102. This is because, when generating the CNM, router 112 uses router 110's MAC address as the destination MAC address of the CNM (since all traffic directed to end station 102 is to be forwarded to router 110). However, when router 110 receives the CNM, it would not take any action, because router 110 is not the source corresponding to the CNM (whereas end station 102 is the correct source), and nor does it even have the capability to be a reaction point (RP) for the CNM protocol. Forwarding devices such as switches, routers, and FCFs, are typically only capable of participating in the CN protocol as a CP. Hence, in the absence of any other processing logic, the CNM generated by router 112 would simply be discarded by router 110. Arrow 118 illustrates a CNM failing to flow from router 112 to end station 102. Similarly, if the CP is located at switch 108, a CNM generated by switch 108 will be addressed to the adjacent router 112 (i.e., has a destination MAC address of router 112's MAC address), which will also result in the CNM being discarded. Arrow 120 illustrates a CNM failing to flow from switch 108 to end station 102. It is also possible that congestion occurs at end station 104. A CNM generated by end station 104 will be addressed to the adjacent layer-3 device, which is router 112, and for the same reason stated above will be discarded. Arrow 122 illustrates a CNM failing to flow from end station 104 to end station 102.

One possible solution to this problem is to allow the routers/FCFs to become the reaction points (RPs), thus accomplishing the congestion management. However, doing so requires sophisticated traffic shapers to be implemented at the router/FCF. For example, the traffic shapers need to provide more than per-priority shaping in order to prevent head-of-line (HOL) blocking and congestion spreading that is observed with hop-by-hop congestion control schemes such as priority-based flow control (PFC) and FC buffer-to-buffer credits. In addition, this solution needs to find a way to map flows to shapers and to carry this "flow awareness" between routers.

In order to facilitate congestion notification within a network with multiple layer-2 domains, in some embodiments of the present invention, a router/FCF is configured to route CNMs. CNMs can optionally include a portion of the sampled frame that resulted in the generation of the CNM. In embodiments of the present invention, this option is enabled and a sufficient number of bytes are returned that include the IP or FC addresses in the sampled frame. Routing of CNMs is performed by looking at the source IP address or FC S_ID from this encapsulated fragment of the sampled frame. When a router/FCF receives a CNM, the router/FCF processes the MSDU, and generates a new layer-2 header for the CNM, wherein the destination MAC address of the CNM is derived based on the source IP address or FC source ID of the congestion source contained in the MSDU. This way, the CNM can be forwarded by the routers/FCFs toward the source of congestion.

Figure 2:
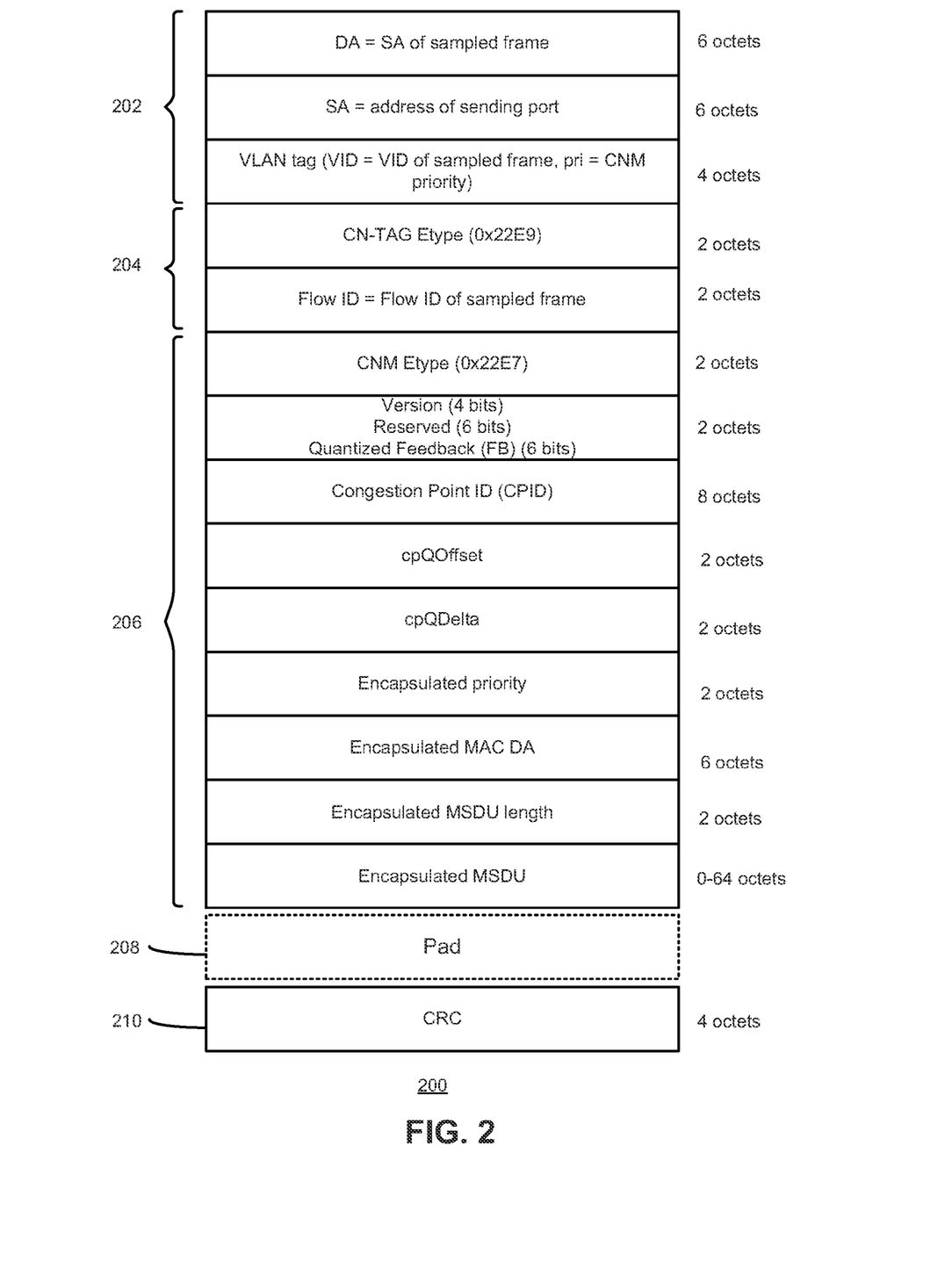
FIG. 2 presents a diagram illustrating the format of an exemplary conventional congestion notification message (CNM).

FIG. 2 presents a diagram illustrating the format of an exemplary congestion notification message (CNM). In this example, a CNM frame 200 includes a MAC header 202, a CN tag 204, a CNM 206, an optional pad field 208, and a cyclic redundancy check (CRC) field 210.

MAC header 202 includes a 6-byte MAC destination address (DA) field (which in the conventional CNM mechanism is the MAC source address of sampled frame in the congested queue, whereas in embodiments of the present invention would be the MAC address of the next-hop layer-2 device derived from the source IP or FC address of the sampled frame), a 6-byte MAC source address (SA) field (which is the MAC address of the port sending the CNM frame), and a 4-byte VLAN tag field. Note that, after being routed, the MAC SA will be updated to the MAC address of the router. The VLAN tag includes a VLAN ID (VID) field, which carries the VLAN ID of the sampled frame, and a priority field, which is set to the priority that is configured for sending CNMs.

CN tag 204 includes a 2-byte Ethertype field with a value of 0x22E9 indicating that the tag type is CN, and a 2-byte flow identifier (flow ID) field. The flow ID is the flow ID of the sampled frame, and can be used to identify the reaction point (RP) that can be used to throttle the flow from which the frame was transmitted.

CNM 206 includes a 2-byte Ethertype field with a value of 0x22E7 indicating that the type of the enclosed protocol data unit (PDU) is CNM, a 4-bit version field, a 6-bit reserved field, a 6-bit quantized feedback field, an 8-byte congestion point identifier (CPID) field, a 2-byte cpQOffset field, a 2-byte cpQDelta field, a 2-byte encapsulated priority field, a 6-byte encapsulated MAC DA field, a 2-byte encapsulated MSDU length field, and a variable length (up to 64 bytes) encapsulated MSDU field.

The version field and the reserved field are typically transmitted with the value 0 and are ignored upon receipt of the CNM frame. The quantized feedback field is the feedback sent to the CP and provides a measure of congestion. A negative value of the quantized feedback field can trigger the transmission of a CNM. The CPID is network-wide unique and identifies the CP that triggered the transmission of the CNM. The cpQOffset field and the cpQDelta field include signed values used for calculating the quantized feedback. The encapsulated priority field, 2 octets in length, contains the priority parameter of the frame that triggers the transmission of this CNM in its most significant 3 bits. The remaining 13 bits of this field are reserved and typically transmitted as "0"s, and are ignored upon receipt. The encapsulated MAC DA address is the MAC DA of the sampled frame. The encapsulated MDSU length includes the number of bytes returned in the following encapsulated MSDU field. The encapsulated MSDU can have a variable length of up to 64 bytes and includes the initial bytes of the MSDU of the sampled frame.

In a conventional layer 2 network implementing congestion notification, upon receiving a CNM, the source end station can determine which RP this CNM applies to based on the flow ID, the encapsulated priority, and the encapsulated MAC DA fields. However, with the existence of routers/FCFs, these fields might be modified going from one layer-2 domain to another, making it impossible for the source end station to determine the RP. For example, in some network implementations, the flow ID field is not preserved going across routers. If the flow ID is not present, then the source end station may find it impossible to identify the RP unless the source only has one RP per priority. In addition, if the CNM priority is different in different layer-2 domains, then the priority information carried in the encapsulated priority field may not be accurate to allow the source to identify the RP. The encapsulated MSDU field may be used by the source end station to determine the flow from which the sampled frame is sent, as long as the network has not performed any transformation (such as adding a MAC-in-MAC header or an IP tunnel header) on the original sampled frame. However, in cases where fragmentation or tunneling is used, the 64-byte encapsulated MSDU field may not provide enough space for carrying sufficient information to identify the flow. Therefore, in order to enable congestion notification across routers/FCFs, the flow ID field needs to be preserved across the routers/FCFs, or in cases where flow ID is not present, the CNM priority needs to be the same throughout the topology (that is, both the priority at which the CNMs are transmitted and the priority on which congestion notification is enabled need to be consistent throughout the network).

Figure 3:
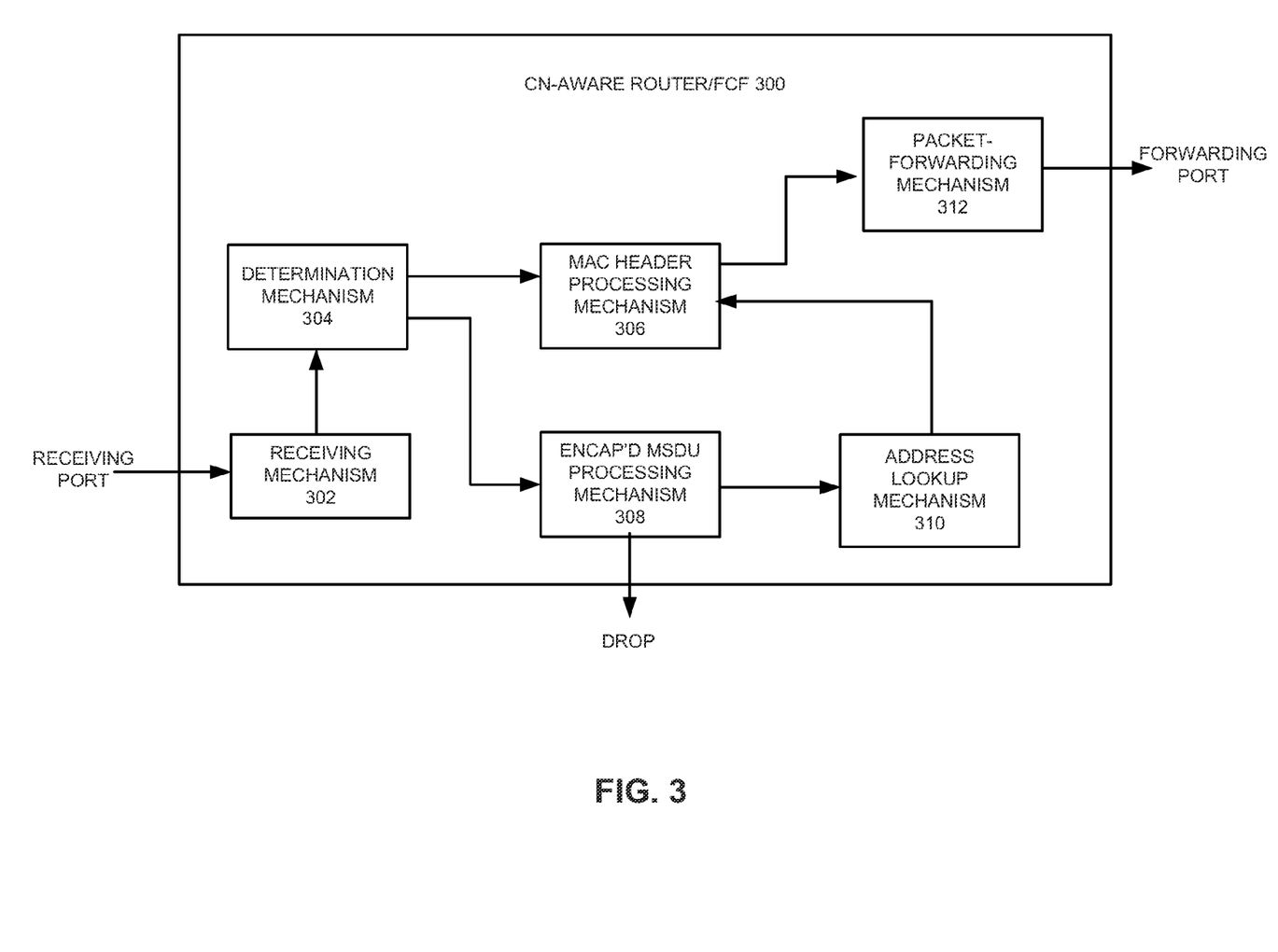
FIG. 3 illustrates the architecture of an exemplary CN-aware router/FCF, in accordance with an embodiment of the present invention.

To enable congestion notification across routers/FCFs, in embodiments of the present invention, the network implements CN-aware routers/FCFs that are capable of processing the CNMs and ensuring that the CNMs reach the correct source end station. FIG. 3 presents the architecture of an exemplary CN-aware router/FCF in accordance with an embodiment of the present invention. A CN-aware router/FCF 300 includes a receiving mechanism 302, a determination mechanism 304, a MAC header processing mechanism 306, an encapsulated MSDU processing mechanism 308, an address lookup mechanism 310, and a packet-forwarding mechanism 312.

During operation, receiving mechanism 302 receives a packet from the receiving port and sends the received packet to determination mechanism 304. Determination mechanism 304 examines the Ethertype field of the received packet and determines whether the packet is a CNM. If the received packet is a CNM and if it is addressed to the router/FCF in question, it is sent to MAC header processing mechanism 306, which removes the MAC header, including the MAC DA field, the MAC SA field, and the VLAN tag. Note that this operation is similar to the operation performed on a regular packet. In addition, the CNM packet is also sent to encapsulated MSDU processing mechanism 308, which examines fields included in the encapsulated MSDU. In one embodiment, encapsulated MSDU processing mechanism 308 examines the first two bytes of the encapsulated MSDU and treats them as the type/length field in an Ethernet frame in order to determine whether the sampled frame is an IP frame, an FCoE frame, or neither. For example, if the first two bytes of the encapsulated MSDU are 0x0800, then the sampled frame is an IPv4 frame. If it is determined that the sampled frame is an IP frame or an FCoE frame, encapsulated MSDU processing mechanism 308 examines the subsequent bytes in the encapsulated MSDU to extract the IP source address (SA) (when the sampled packet is an IP packet) or the FC source identifier (S_ID) (when the sampled packet is an FC packet). The extracted IP SA or FC S_ID is then sent to address lookup mechanism 310, which performs an IP or FC address lookup in order to obtain a destination MAC address as well as a VLAN tag corresponding to the IP/FC address. (This operation is similar to what is done to regular IP/FC packets during a normal forwarding process.) Note that this destination MAC address can be the MAC address of the next-hop IP router or FCF, if the congestion source is not in the same layer-2 domain, or the MAC address of the congestion source, if it is in the same layer-2 domain.

The obtained MAC address and the VLAN tag are then sent back to MAC header processing mechanism 306, which generates a new MAC header for the CNM. The MAC DA and the VLAN tag of the newly generated MAC header come from the IP/FC lookup. In one embodiment, if it is determined that the sampled frame is neither an IP frame nor an FCoE frame, then CN-aware router/FCF discards the CNM.

Because the CNM is not a conventional IP frame, there is no standard time-to-live (TTL) field included in the CNM frame. To ensure that the CNM does not experience loops, in one embodiment, a TTL value is included in the encapsulated MSDU and is decremented each time the CNM passes a router. Note that although conventional FC frames do not include a TTL field, an optional TTL value in the MSDU can still be used if the CNM-forwarding-capable FCFs are made aware of this TTL value (and can decrement it at each hop) to prevent looping. In one embodiment, the initial TTL of the sampled frame can be set at least twice as much as is needed for the sampled frame to get from the source end station to the target end station. This is to ensure that the TTL of the encapsulated frame can be reused for the purpose of loop mitigation and would be decremented at each router hop which processes the CNM. In a further embodiment, the TTL value in the encapsulated MSDU can be initialized to a predetermined value known to be sufficiently large to reach any node in the network. For example, in one embodiment, the TTL value can be initialized to 255.

Figure 4:
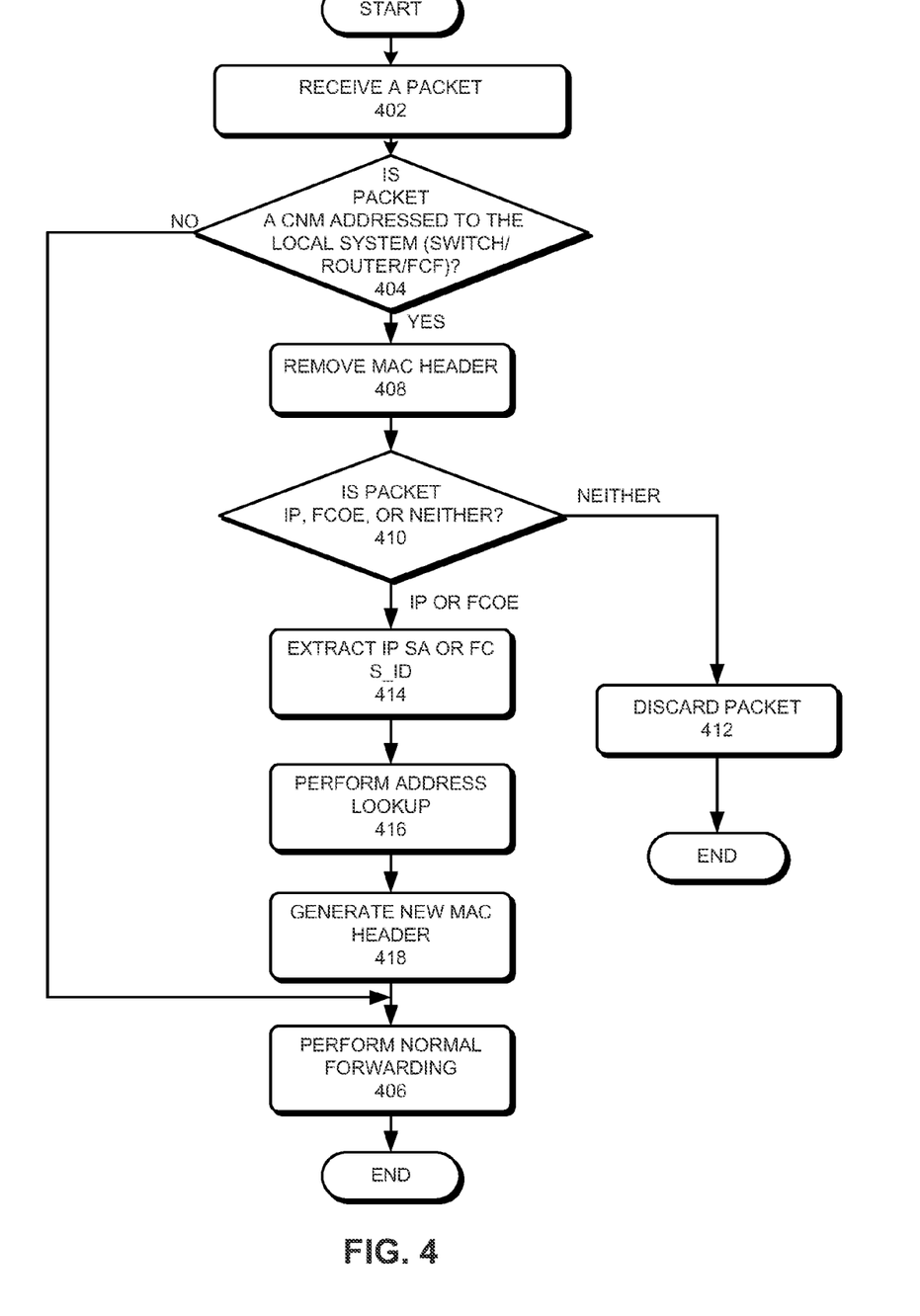
FIG. 4 presents a flowchart illustrating the process of routing a congestion notification message (CNM), in accordance with an embodiment of the present invention.

FIG. 4 presents a flowchart illustrating the process of routing a CNM in accordance with an embodiment of the present invention. During operation, a router or FCF receives a packet (operation 402), and determines whether the packet is a CNM addressed to the local system (switch/router/FCF) (operation 404). In one embodiment, the router/FCF examines the Ethertype field included in the packet to determine whether the packet is a CNM. If the packet is not a CNM, the router/FCF performs a normal forwarding operation on the packet (operation 406). If the packet is a CNM, the router/FCF removes the MAC header of received packet (operation 408). In one embodiment, the removed MAC header includes the MAC SA, the MAC DA, and the VLAN tag. The router/FCF then examines the first two bytes of the encapsulated MSDU to determine whether the sampled frame triggering the CNM is an IP packet, an FCoE packet, or neither (operation 410). If the sampled frame is neither an IP packet nor an FCoE packet, the router/FCF discards the CNM (operation 412). If the sampled frame is an IP packet or an FCoE packet, the router/FCF extracts the IP source address (SA) or FC source ID (S_ID) included in the encapsulated MSDU (operation 414). Subsequently, the router/FCF performs an address lookup using the IP SA or the FC S_ID to obtain the MAC address of the next-hop layer-2 device (operation 416). The router/FCF then uses the outcome of the address lookup to generate a new MAC header for the CNM (operation 418). In one embodiment, the DA of the new MAC header is the MAC address corresponding to the IP SA or FC S_ID, which can be the MAC address of a next-hop router/FCF toward the source of the sampled frame or the MAC address of the end station originating the sampled frame. In a further embodiment, the MAC SA is the MAC address of the router/FCF processing the CNM. The router/FCF then performs a normal forwarding operation on the CNM based on its new MAC header (operation 406).

Congestion Notification in a VCS or Ethernet Fabric System

In a network implementing FCoE, in addition to using the FC header embedded in the encapsulated MSDU to route the CNM, it is also possible to allow a switch to generate CNMs directly addressed to source end stations. In other words, each switch has the ability to deduce the MAC address of the source end station of a sampled frame, even if source end station is at the other side of an FCF. This condition can possibly be met by a Virtual Cluster Switching (VCS) or Ethernet fabric system disclosed in U.S. Provisional Application No. 60/330,678, entitled "Virtual Cluster Switching," by inventors Suresh Vobbilisetty and Dilip Chatwani, filed 3 May 2010, U.S. Provisional Application No. 61/334,945, entitled "Virtual Cluster Switching," by inventors Suresh Vobbilisetty and Dilip Chatwani, filed 15 May 2010, and U.S. Provisional Application No. 61/380,819, entitled "Virtual Cluster Switching," by inventors Suresh Vobbilisetty and Dilip Chatwani, filed 8 Sep. 2010, the disclosures of which are incorporated by reference herein.

A VCS or Ethernet fabric system includes a number of interconnected switches. In order to enable automatic configuration of the VCS, each switch runs an FC control plane protocol and an Ethernet-based transport protocol on its ports.

More specifically, the transport protocol run on the inter-switch ports is the Transparent Interconnection of Lots of Links (TRILL) protocol.

Figure 5:
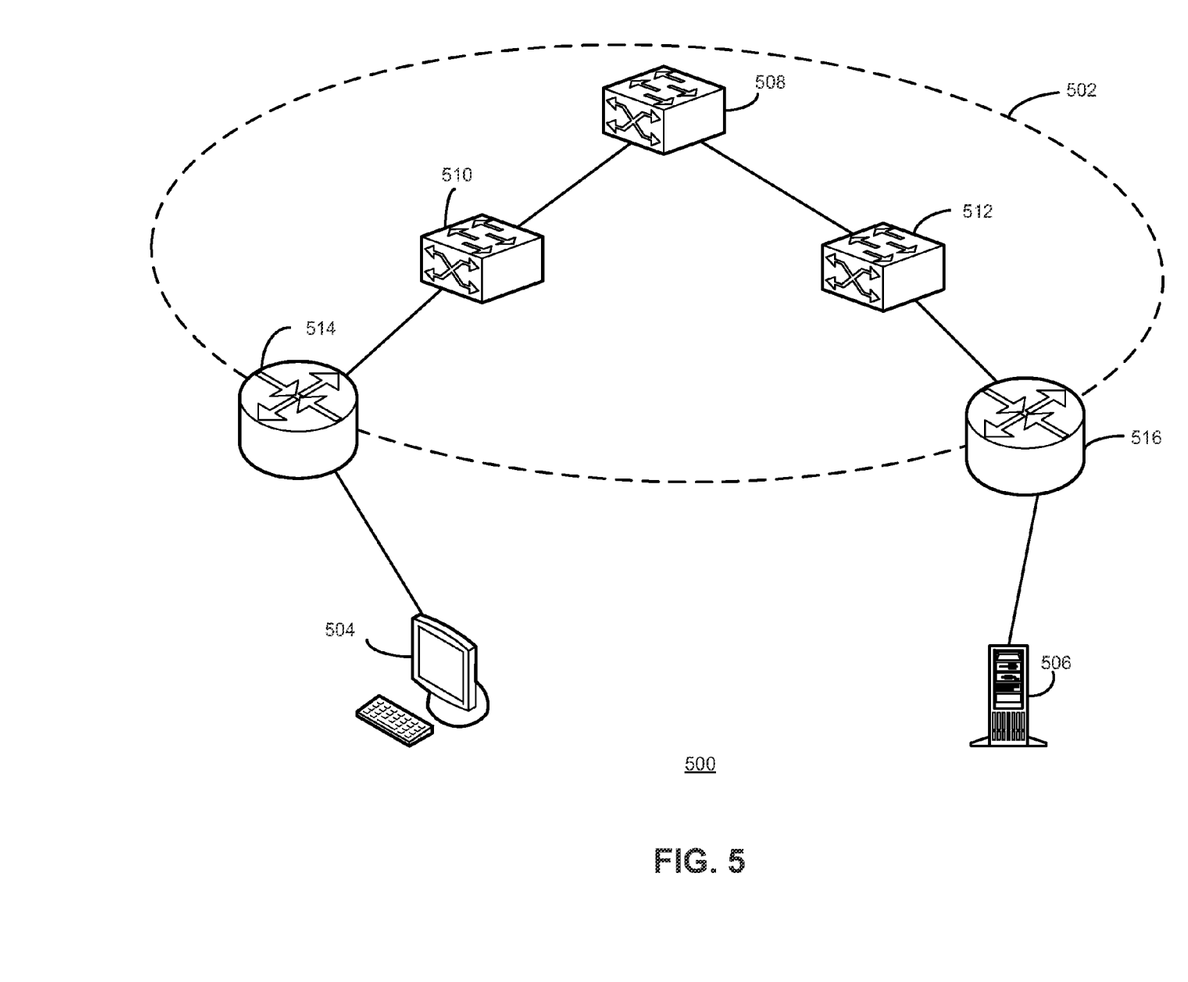
FIG. 5 presents a diagram illustrating an exemplary network implementing a Virtual Cluster Switching (VCS) system, in accordance with an embodiment of the present invention.

FIG. 5 presents a diagram illustrating an exemplary network implementing a VCS system. Network 500 includes a VCS 502 and end stations 504 and 506. VCS 502 includes a number of TRILL RBridges 508, 510, and 512, which are controlled by the FC switch-fabric control plane. Also included in VCS 502 are Fibre Channel forwarders (FCFs) 514 and 516 at the edge. End station 504 is coupled to FCF 514 and end station 506 is coupled to FCF 516. Note that an FCoE packet from end station 504 can be routed by VCS 502 to reach end station 506. For example, an FCoE packet from end station 504 destined to end station 506 first reaches FCF 514, which processes the Ethernet MAC header of the packet and forwards the packet to FCF 516 via RBridges 508, 510, and 512. FCF 516 then forwards the packet to end station 506.

As one can see in FIG. 5, for traffic flowing from end station 504 to end station 506, if congestion occurs within VCS 502, a conventionally generated CNM may not be able to reach source end station 504. For example, RBridge 508 detects congestion and generates a CNM based on a sampled packet. However, instead of addressing the CNM to source end station 504, the CNM is addressed to FCF 514 because, from the point of view of RBridge 508, the sampled packet triggering the CNM originated from FCF 514. FCF 514 receives the CNM addressed to itself and discards it without the knowledge that the CNM is intended for source end station 504.

In order to enable congestion notification in a VCS or Ethernet fabric network, an RBridge is configured to generate a CNM that is addressed to the end stations rather than to the FCFs. To facilitate such an implementation, the FC VLAN for a fabric is maintained the same regardless of whether the VLAN is between an end station and an FCF or between FCFs. In other words, network 502 shown in FIG. 5 only maintains one VLAN per FCoE fabric (there could be other VLANs for additional FCoE fabrics and VLANS not used for FCoE purposes in the same network). In addition, within a VCS, a packet only encounters at most one FCF, the one adjacent to the origin of the packet. Note that, by the time the packet reaches a second FCF, it has reached the last-hop FCF.

Using the example in FIG. 5, during operation, end station 504 sends a packet to end station 506. The packet is addressed to FCF 514 over a VLAN. Subsequently, FCF 514 examines the FC D_ID of the packet, creates a new MAC header based on the FC D_ID, and sends the packet to FCF 516 on the same VLAN, which forwards the packet to end station 506 according to the newly generated MAC header. By maintaining the same VLAN across the FCoE fabric, it is possible for any RBridge within VCS 502 to generate a CNM directly addressed to an end station.

Figure 6:
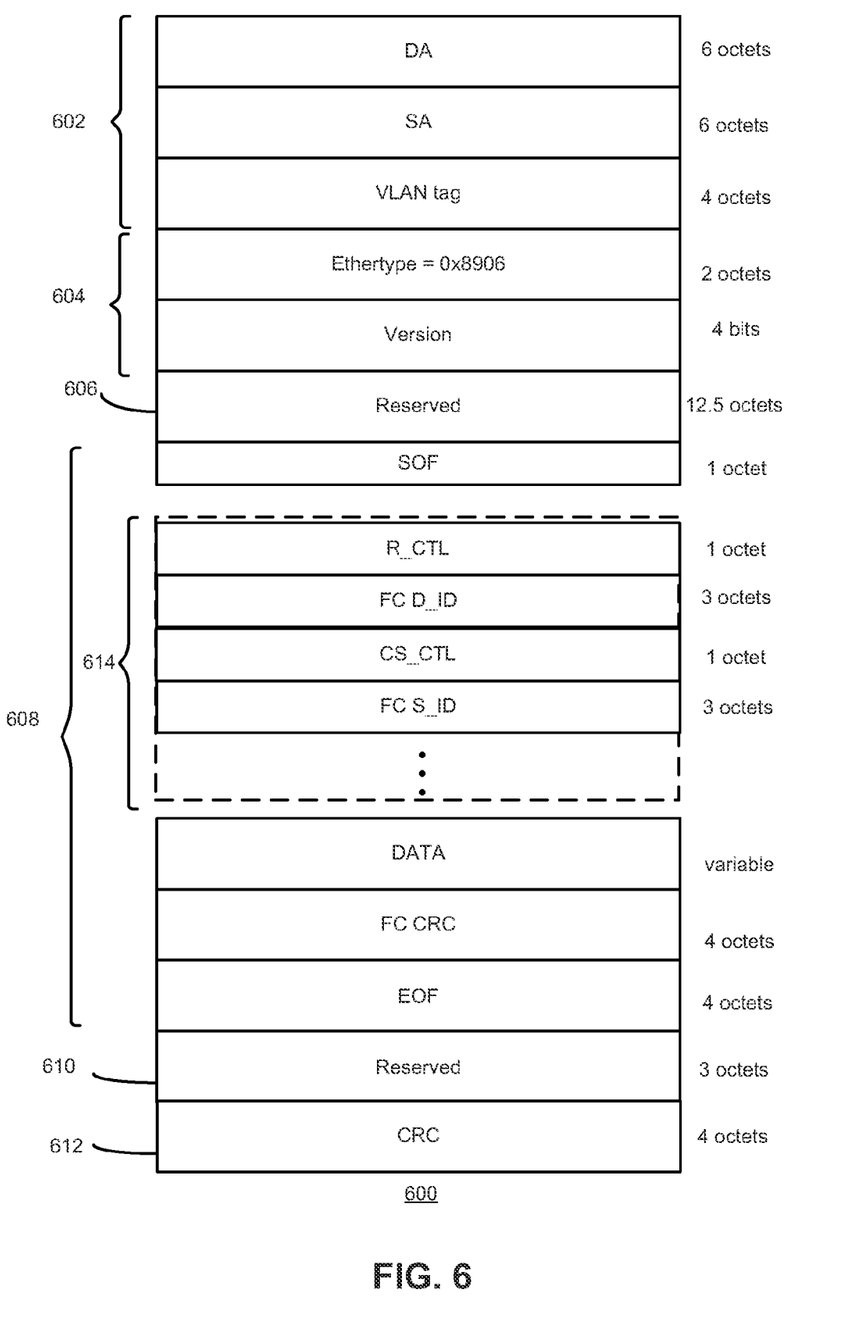
FIG. 6 presents a diagram illustrating an exemplary Fiber Channel over Ethernet (FCoE) frame sent by an end station.

FIG. 6 presents a diagram illustrating an exemplary FCoE frame sent by an end station. An FCoE frame 600 includes a MAC header 602, an FCoE tag 604, a reserved field 606, an encapsulated FC frame 608, a reserved field 610, and a CRC field 612.

MAC header 602 includes a 6-byte destination address (DA), a 6-byte source address (SA), and a 4-byte VLAN tag. Note that for FCoE end stations have fabric provided MAC addresses (FPMA), which are dynamically assigned by the fabric. The FPMA is built by appending the FC_ID (such as the S_ID or the D_ID) to a 24-bit quantity called the FCoE MAC address prefix (FC-MAP). The FC-MAP is VLAN specific. Hence, forcing the FCoE fabric to maintain only one VLAN makes the FC-MAP value consistent across the fabric.

FCoE tag 604 includes a 2-byte Ethertype field with a value of 0x8906 and optionally a flow ID field (not shown), indicating this frame is an FCoE frame. FCoE tag 604 also includes a 4-bit version field.

Encapsulated FC frame 608 includes a 1-byte start of frame (SOF) delimiter, a 24-byte FC header 614, a data field with variable length, a 4-byte FC cyclic redundancy check (CRC) field, and a 4-byte end of frame (EOF) field.

The format of FC header 614 varies slightly depending on the FC protocol. In general it contains a one-byte routing control (R_CTL) field, a 3-byte FC destination address (D_ID) field, a one-byte class-of-service control (CS_CTL) field, a 3-byte FC source address (S_ID) field, and control fields that indicate the frame's content (control information or data type) and position within a series of sequential frames.

In the example shown in FIG. 5, an FCoE packet is sent from end station 504 to end station 506 via VCS 502. FCF 514 receives the packet and generates a new MAC header based on the FC D_ID of the packet. The new MAC header includes the new MAC DA, which is the MAC address of FCF 516, the new MAC SA, which is the MAC address of FCF 514, and the VLAN tag. The encapsulated FC frame stays the same with its FC S_ID being the FC ID of source end station 504 and its FC D_ID being the FC ID of target end station 506.

For traffic flow from end station 504 to end station 506, if RBridge 508 experiences congestion, it needs to generate a CNM and send it back to source end station 504. As discussed previously, a conventional congestion notification mechanism will not work. To solve this problem, in embodiments of the present invention, the RBridges within the VCS are configured to generate CNMs that are directly addressed to the real source end station.

Figures 7A, 7B:
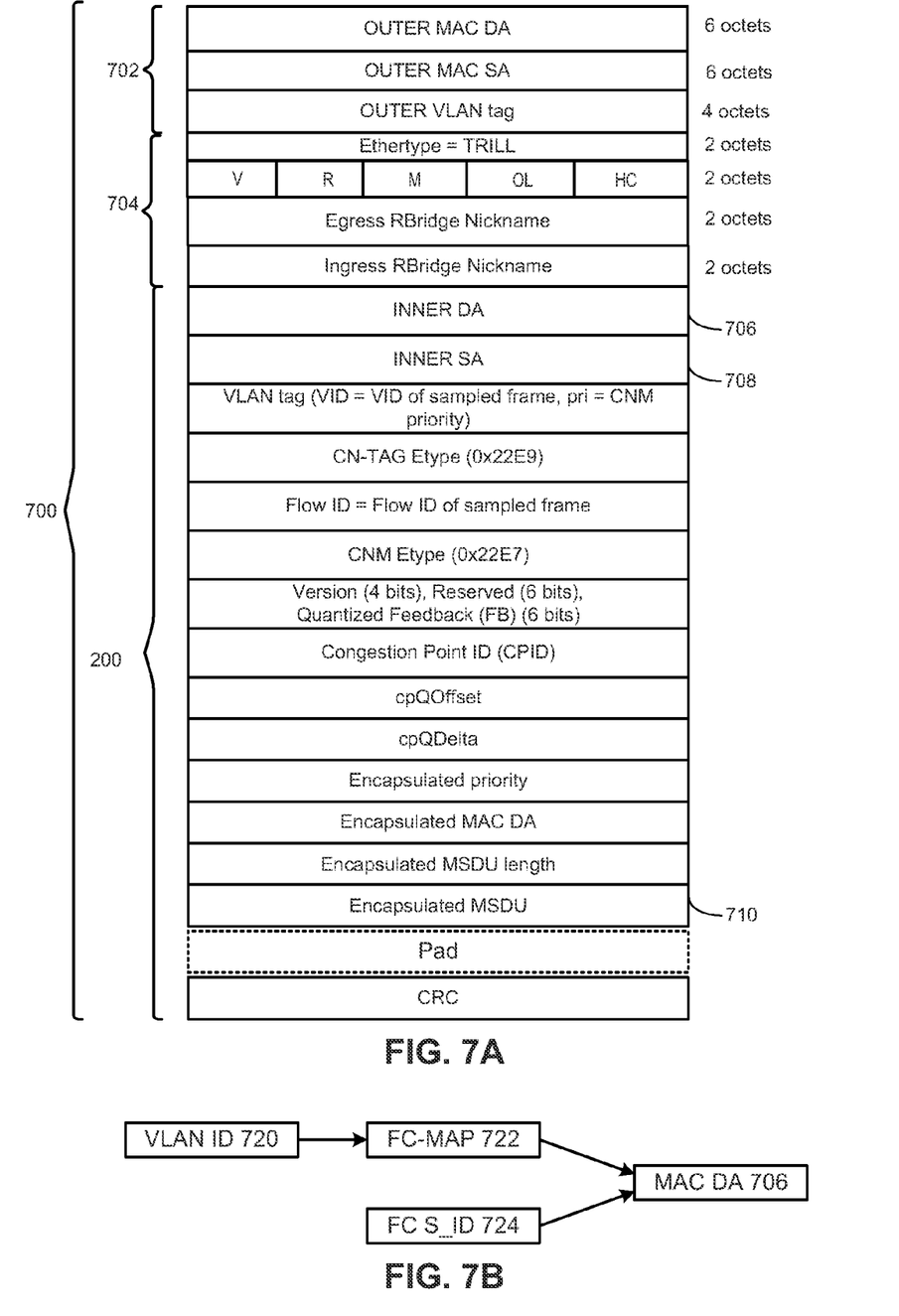
FIG. 7A presents a diagram illustrating the format of an exemplary CNM generated by a switch within a VCS system, in accordance with an embodiment of the present invention.
FIG. 7B presents a block diagram illustrating the process of deriving an inner MAC DA for a CNM in a TRILL network based on a VLAN ID and the FC S_ID of a sampled frame, in accordance with an embodiment of the present invention.

FIG. 7A presents a diagram illustrating the format of an exemplary CNM generated by a VCS switch, in accordance with an embodiment of the present invention. Note that the transport protocol running on the inter-switch ports is TRILL; hence, the CNM generated by the RBridge is a TRILL frame. In this example, a CNM TRILL frame 700 includes an outer MAC header 702, a TRILL header 704, and an inner CNM 200 (similar to the CNM 200 illustrated in FIG. 2).

Outer MAC header 702 includes a 6-byte outer MAC DA field, a 6-byte outer MAC SA field, and a 4-byte outer VLAN tag. The outer MAC DA field and the outer MAC SA field specify the next hop RBridge and the transmitting RBridge, respectively, and the outer VLAN tag includes an outer VLAN ID (specified by the designated RBridge for the link onto which the TRILL frame is being sent) and a priority field.

TRILL header 704 includes a 2-byte Ethertype field specifying that the Ethertype is TRILL, a 2-bit version (V) field, a 2-bit reserved (R) field, a 1-bit multi-destination (M) field, a 5-bit options length (OL) field, a 6-bit hop count (HC) field, a 2-byte egress RBridge nickname field, and a 2-byte ingress RBridge nickname field.

Inner CNM 200 includes an inner DA 706 and inner SA 708 (corresponding to the DA and SA fields in header 202 as illustrated in FIG. 2, respectively). The rest of the fields in CNM 200 are similar to those illustrated in FIG. 2.

The encapsulated MSDU 710 is an encapsulated FCoE frame, or a portion thereof, sent from the source end station. Encapsulated MSDU 710 includes a 2-byte Ethertype field with the value of 0x8906, indicating that the encapsulated frame is an FCoE frame.

Referring to the example shown in FIG. 5, CNM TRILL frame 700 is generated by RBridge 508 and the sampled frame resembles the FCoE frame 600 shown in FIG. 6. Accordingly, the outer MAC DA is the MAC address of RBridge 510 because it is the next hop address, and the outer MAC SA is the MAC address of RBridge 508 because it is the transmitting RBridge. The egress RBridge nickname field is the ingress RBridge of the sampled frame, which is FCF 514. The ingress RBridge nickname field is the RBridge generating CNM frame 700, which is RBridge 508. Inner MAC DA 706 specifies the MAC address of the destination of the inner frame. In this example, the inner frame is the CNM that needs to be sent to source end station 504. Therefore, to ensure that the CNM can be eventually forwarded to source end station 504, RBridge 508 generates inner MAC DA 706 corresponding to the MAC address of source end station 504.

To enable a switch within the VCS (an RBridge) to generate a CNM that is directly addressed to the source of the sampled frame, in one embodiment of the present invention, all RBridges within the VCS are aware of the VLAN-specific FC-MAP. In one embodiment, an RBridge maintains a table that maps VLAN identifiers (VLAN IDs) to FC-MAPs. By examining the VLAN ID contained within the inner MAC header, the RBridge can obtain the FC-MAP. In addition, the RBridge is configured to examine the encapsulated FC frame in the sampled frame to extract the FC S_ID. In the example shown in FIG. 5, the FC S_ID is the FC ID of end station 504. Subsequently, the RBridge can deduce the MAC address of source end station 504 by appending the FC S_ID to the FC-MAP. The deduced MAC address of the source end station is then filled into inner MAC DA field 706, which specifies the destination of the inner frame. Inner MAC SA 708 is the MAC address of the RBridge generating the CNM, which is RBridge 508.

FIG. 7B illustrates the process of deriving inner MAC DA 706 for a CNM in a TRILL network. In this example, an RBridge first maps a sampled frame's VLAN ID 720 to an FC-MAP 722. Subsequently, the sampled frame's FC S_ID 724 is appended after FC-MAP 722 to obtain the MAC DA 706.

The generated CNM frame 700 is first forwarded within VCS 502 based on information included in the outer MAC header and the TRILL header until it reaches the edge device, which in this case is FCF 514. FCF 514 then removes the outer MAC header and the TRILL header and forwards the CNM based on address information included in the inner MAC header. Because the inner MAC header specifies end station 504 as the destination, the CNM is forwarded to end station 504, which is the source end station of the sampled frame.

Figure 8:
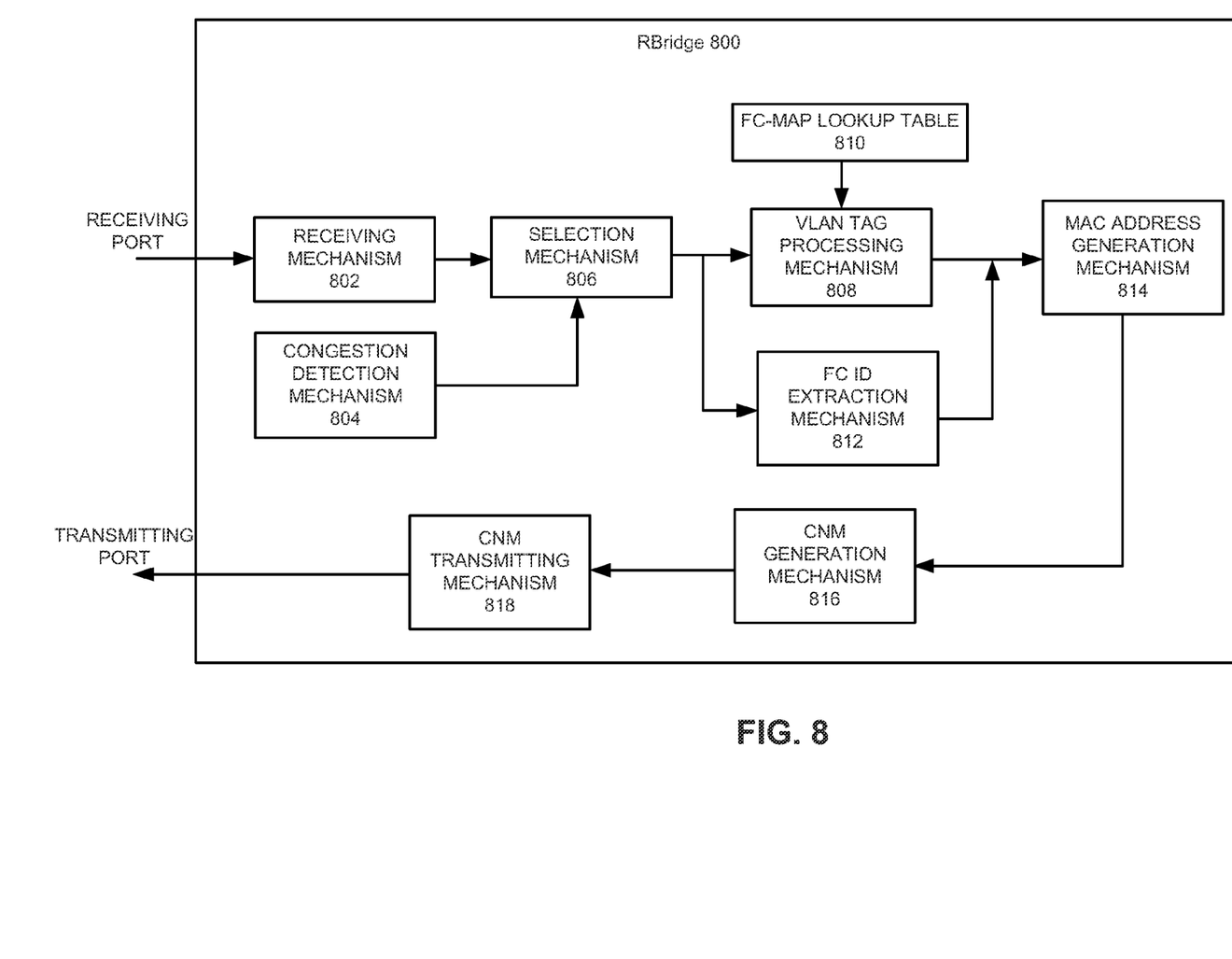
FIG. 8 presents the architecture of an exemplary routing bridge (RBridge) capable of generating a CNM addressed to the source end station of a sampled frame, in accordance with an embodiment of the present invention.

FIG. 8 presents the architecture of an exemplary RBridge capable of generating a CNM addressed to the source end station of a sample frame, in accordance with an embodiment of the present invention. RBridge 800 includes a receiving mechanism 802, a congestion detection mechanism 804, a selection mechanism 806, a VLAN tag processing mechanism 808, a VLAN ID to FC-MAP lookup table 810, an FC ID extraction mechanism 812, a MAC address generation mechanism 814, a CNM generation mechanism 816, and a CNM-forwarding mechanism 818.

During operation, receiving mechanism 802 receives a packet flow from a receiving port. Upon congestion detection mechanism 804 detecting congestion on RBridge 800, selection mechanism 806 selects a packet from the congested queue and sends the selected packet to VLAN tag processing mechanism 808 and FC ID extraction mechanism 812. VLAN tag processing mechanism examines the VLAN tag of the selected frame and uses the VLAN ID to obtain a corresponding FC-MAP from VLAN ID to FC-MAP lookup table 810. FC ID extraction mechanism 812 extracts the FC S_ID from the encapsulated FC frame included in the selected packet. MAC address generation mechanism 814 generates a MAC address by appending the extracted FC S_ID to the FC-MAP.

CNM generation mechanism 818 then generates a CNM for the selected frame. The CNM follows the frame format of a TRILL protocol data unit (PDU), which includes an inner MAC header. The inner MAC header includes an inner MAC DA field filled with the MAC address generated by MAC address generation mechanism 814, an inner MAC SA field filled with the MAC address of RBridge 800, and a VLAN tag field with VLAN ID copied from the selected packet. The generated CNM is then transmitted to the source end station by CNM transmitting mechanism 820.

Figure 9:
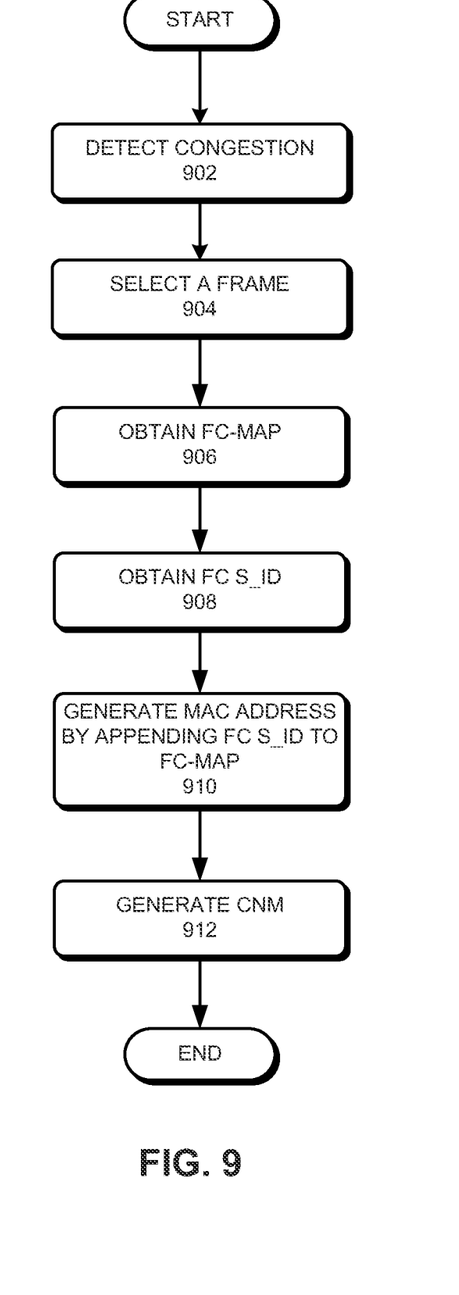
FIG. 9 presents a flowchart illustrating the process of generating a CNM within a VCS system, in accordance with an embodiment of the present invention.

FIG. 9 presents a flowchart illustrating the process of generating a CNM within a VCS system in accordance with an embodiment of the present invention. During operation, a switch, such as an RBridge, within the VCS system detects congestion (operation 902), and selects a frame from the congested queue (operation 904). In one embodiment, the selected frame includes an FCoE frame. The switch examines the VLAN ID of the selected frame and performs a VLAN ID to FC-MAP lookup to obtain the VLAN-specific FC-MAP (operation 906). The switch further extracts the FC S_ID from the encapsulated FC frame within the selected frame (operation 908). Subsequently, the switch appends the 24-bit FC S_ID to the 24-bit FC-MAP to generate a 48-bit MAC address (operation 910). This generated MAC address is the MAC address of the source end station of the selected frame. The switch then generates a CNM based on the selected frame and the generated MAC address (operation 912). In one embodiment, the generated CNM is a TRILL packet and the inner MAC DA address of the TRILL packet is the generated MAC address, and the inner MAC SA address of the TRILL packet is the MAC address of the RBridge. The VLAN ID and the flow ID included in the CNM are copied from the selected frame.

The data structures and code described in this disclosure can be partially or fully stored on a non-transitory computer-readable storage medium and/or a hardware module and/or a hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other non-transitory media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed. Specifically, the methods and/or processes may be described in a hardware description language (HDL) which may be compiled to synthesize register transfer logic (RTL) circuitry which can perform the methods and/or processes.

The methods and processes described in this disclosure can be partially or fully embodied as code and/or data stored in a computer-readable storage medium or device, so that when a computer system reads and/or executes the code and/or data, the computer system performs the associated methods and processes. The methods and processes can also be partially or fully embodied in hardware modules or apparatuses, so that when the hardware modules or apparatuses are activated, they perform the associated methods and processes. Further, the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners having ordinary skill in the art. Additionally, the above disclosure is not intended to limit the present invention. The scope of the present invention is defined by the appended claims.

What is claimed is:

1. A computing system, comprising:
a processor;
a computer-readable storage medium storing instructions which when executed by the processor causes the processor to perform a method, the method comprising:
removing a layer-2 header of a congestion notification message that includes a destination layer-2 address set as the computing system's layer-2 address, wherein the congestion notification message includes a sampled packet from a congested flow; and
assigning a layer-2 destination address to a locally generated second layer-2 header for the congestion notification message, wherein the assigned layer-2 destination address is derived based on the source address of the sampled packet.

2. The computing system of claim 1, wherein a source layer-2 address and optionally a virtual local area network (VLAN) identifier of the congestion notification message are modified based on the source address of the sampled packet from the congested flow.

3. The computing system of claim 1, wherein the source address of the sampled packet from the congested flow is contained in a media access control (MAC) service data unit in the congestion notification message.

4. The computing system of claim 1, wherein the source address of the sampled packet from the congested flow is an Internet Protocol (IP) address or Fibre Channel source identifier.

5. The computing system of claim 1, wherein the congestion notification message includes a time-to-live field.

6. The computing system of claim 1, wherein the method further comprises:
determining a layer-2 destination address based on the source address of the sampled packet from the congested flow; and
generating the second layer-2 header based on the determined layer-2 destination address for the congestion notification message.

7. The computing system of claim 1, wherein the layer-2 header is an Ethernet header.

8. The computing system of claim 1, wherein the method further comprises looking up a destination layer-2 address based on the source address of the sampled packet from the congested flow.

9. The computing system of claim 1, wherein the received congestion notification message is in compliance with Institute of Electrical and Electronics Engineers (IEEE) standard 802.1Qau; and
wherein the source address of the sampled packet from the congested flow is contained in a MAC service data unit within the message.

10. A computer executable method, comprising:
removing a layer-2 header of a congestion notification message that includes a destination layer-2 address set as a local computing system's layer-2 address, wherein the congestion notification message includes a sampled packet from a congested flow; and
assigning a destination layer-2 address to a locally generated second layer-2 header for the congestion notification message, wherein the assigned layer-2 destination address is derived based on the source address of the sampled packet.

11. The method of claim 10, further comprising modifying a source layer-2 address and optionally a virtual local area network (VLAN) identifier of the congestion notification message, based on the source address of the sampled packet from the congested flow.

12. The method of claim 10, wherein the source address of the sampled packet from the congested flow is contained in a media access control (MAC) service data unit in the congestion notification message.

13. The method of claim 10, wherein the source address of the sampled packet from the congested flow is an Internet Protocol (IP) address or Fibre Channel source identifier.

14. The method of claim 10, further comprising decrementing a time-to-live field included in the congestion notification message.

15. The method of claim 10, further comprising:
determining a layer-2 destination address based on the source address of the sampled packet from the congested flow; and
generating the second layer-2 header based on the determined layer-2 destination address for the congestion notification message.

16. The method of claim 10, wherein the layer-2 header is an Ethernet header.

17. The method of claim 10, further comprising looking up a destination layer-2 address based on the source address of the sampled packet from the congested flow.

18. The method of claim 10, wherein the received congestion notification message is in compliance with Institute of Electrical and Electronics Engineers (IEEE) standard 802.1Qau; and
wherein the source address of the sampled packet from the congested flow is contained in a MAC service data unit within the message.

19. A switch, comprising:
a header processing module operable to removing a layer-2 header of a congestion notification message that includes a destination layer-2 address set as the switch's layer-2 address, wherein the congestion notification message includes a sampled packet from a congested flow; and
a header-generating module operable to assign a layer-2 destination address to a locally generated second layer-2 header for the congestion notification message, wherein the assigned layer-2 destination address is derived based on the source address of the sampled packet.

20. The switch of claim 19, wherein the source address of the sampled packet from the congested flow is deduced based on information included in an encapsulated frame; and
wherein the encapsulated frame is a Fibre Channel over Ethernet (FCoE) frame, and wherein the FCoE frame includes an Ethernet header, an FCoE header, and an encapsulated Fibre Channel (FC) frame.

21. The switch of claim 20, further comprising an FC media-access-control address prefix (FC-MAP) lookup module operable to look up an FC-MAP based on a virtual local area network (VLAN) ID included in the FCoE frame.

22. The switch of claim 21, wherein the source address of the sampled packet from the congested flow is deduced by appending an FC source identifier (FC S_ID) included in the encapsulated FC frame to the FC-MAP.

23. The switch of claim 19, wherein the second layer-2 header includes an Ethernet destination address field, an Ethernet source address field, and a virtual local area network (VLAN) identifier field.

24. The switch of claim 19, wherein the switch is a routing bridge (RBridge) which implements a Transparent Interconnection of Lots of Links (TRILL) protocol, and wherein the congestion notification message is encapsulated in a TRILL packet.

* * * * *